United States Patent [19]
Corey

[11] Patent Number: 5,995,708
[45] Date of Patent: *Nov. 30, 1999

[54] METHOD AND SYSTEM FOR DELIVERING AUDIO AND VIDEO INFORMATION

[75] Inventor: Douglas Arthur Corey, Boulder, Colo.

[73] Assignees: MediaOne Group, Inc., Englewood, Colo.; U S West, Inc., Denver, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 09/027,692

[22] Filed: Feb. 23, 1998

Related U.S. Application Data

[63] Continuation of application No. 08/040,740, Mar. 31, 1993.

[51] Int. Cl.$^6$ ..................................................... H04N 5/91
[52] U.S. Cl. .............................................. 386/83; 386/104
[58] Field of Search ................................. 386/46, 83, 92, 386/109, 112, 1, 104; 348/6, 7, 12, 13, 8

[56] References Cited

U.S. PATENT DOCUMENTS

| | | |
|---|---|---|
| 4,506,387 | 3/1985 | Walter . |
| 4,709,418 | 11/1987 | Fox et al. . |
| 4,949,187 | 8/1990 | Cohen .......................................... 348/7 |
| 5,144,661 | 9/1992 | Shamosh et al. . |
| 5,172,413 | 12/1992 | Bradley et al. . |
| 5,216,515 | 6/1993 | Steele et al. . |
| 5,218,454 | 6/1993 | Nagawasa et al. . |
| 5,229,850 | 7/1993 | Toyoshima . |

*Primary Examiner*—Robert Chevalier
*Attorney, Agent, or Firm*—Brooks & Kushman P.C.

[57] ABSTRACT

A method and system is disclosed for transmitting audio and video data to a remote viewing station. The method includes the steps of receiving a signal at a control station representing a request for the audio and video data. The method further includes determining whether the requested data is stored at a mass storage facility or at an active line storage unit. If the requested data is stored at the mass storage facility, the method includes downloading and storing the data at the active line storage unit. Finally, the method includes the step of transmitting the stored data from the active line storage unit to the remote viewing station.

21 Claims, 2 Drawing Sheets

METHOD AND SYSTEM FOR DELIVERING AUDIO AND VIDEO INFORMATION

This is a continuation of copending application Ser. No. 08/040,740 filed on Mar. 31, 1993.

TECHNICAL FIELD

This invention relates to methods and systems for telecommunication of audio and video programming. More specifically, this invention relates to methods and systems for providing audio and video programming in response to a user's request using a telecommunication distribution system with a central or distributed station.

BACKGROUND ART

Recently, there has been great interest in providing audio/video programming to consumers in a timely and efficient manner. The optimal delivery system would be capable of receiving a program request from a user and transmitting the requested programming directly to the user immediately after receiving the program request. Such services are often referred to as "video-on-demand" services.

The current audio/video delivery networks, including telephone and cable television ("CATV") networks, are not capable of providing true "on-demand" programming in a timely and efficient manner. The prior art does not describe a method or system for efficiently providing a service that delivers requested programming immediately upon a user request.

The existing networks are deficient in several areas. First, the existing networks are not capable of providing the bandwidth needed for individual household entertainment grade audio/video channels. While existing telephone networks provide individual channels via a widely connected network from and to each household, the capacity of the channel is limited to low grade audio which is not suitable for delivering quality audio/video programming.

Modern CATV networks, on the other hand, provide the bandwidth needed, but these networks are designed to broadcast a selected set of channels to a large number of households. Each household is restricted to viewing programs from a selected set of channels. The CATV provider defines the program content and timing.

A second deficiency of the prior art concerns the switching capabilities of the existing networks. Assuming that source origination is not economical at the local "central office" or "headend" of the network, this portion of the network needs to be switched. Current CATV systems have no provision for this type of switching. Telephony based systems, while providing a limited switching function, do not have the necessary capacity or flexibility.

Yet another deficiency of the prior art is the need for a audio/video server which can provide requested programming to the distribution network. Several different approaches have been tested by companies attempting to develop a practical server. One such effort employs banks of VCRs, shelves of video tapes and human operators. Unfortunately, this method is labor intensive and prone to human error.

U.S. Pat. No. 4,506,387 discloses a system and method for providing programming-on-demand which downloads programming on a non-real-time basis to a receiving station at a user's location. This method and system is costly as it requires specialized equipment at each user's location. Furthermore, it does not satisfy the requirements of a true video-on-demand service as it does not operate in real time.

Two other systems rely on advanced disk array technology and on schemes for laying out the audio/video data on the disks to facilitate retrieval and distribution of the data when requested. Although this system might work on a small scale, large scale implementation of this system is costly as it requires specialized and expensive hardware.

Yet another system uses a large solid state RAM and a high speed magnetic tape for bulk storage. Like the previous approaches, the hardware required for large scale implementation of this system is cost prohibitive.

The prior art approaches to providing automated video-on-demand services have focused on deficiencies of the data processing systems used in the distribution networks. While increasing the speed and capacity of such systems may provide a technical solution to the current problems in the field, this type of approach has proven to be costly.

A need therefore exists for a method and system which addresses the shortcomings of the prior art. A need exists for a method and system for efficiently and cost effectively delivering audio/video programming to one of a number of users based upon the user's request. Furthermore, a need exists for a method and system for efficiently responding to a user's program request to minimize the time interval between the user's program request and the user's reception of the requested programming.

SUMMARY OF THE INVENTION

The present invention described and disclosed herein comprises a method and system of delivering audio/video programming to one of a number of remote viewing stations based upon a program request received from the remote viewing station.

Accordingly, it is an object of the present invention to minimize unnecessary data transmission in the audio/video delivery system.

Another object of the present invention is to provide a method and system for efficiently delivering audio/video data representing the requested program to a remote viewing station at the time requested.

Yet another object of the present invention is to provide a method and system for minimizing the time interval between receiving the program request and displaying the audio/video program at the remote viewing station.

A further object of the present invention is to provide a method and system for allowing a user to control the audio/video programming during transmission to the remote viewing station.

In carrying out the above objects and other objects of the present invention, a method is provided for delivering audio/video data to a remote viewing station in a telecommunications system. The viewing station must include a display device which allows a user to hear sounds and view images displayed at a standard playback speed. The sounds and images are represented by the audio/video data.

The method includes the step of receiving a signal at a system control unit. The signal representing a request for the audio/video data. The method further includes the step of determining if the requested data is stored at an available active line storage facility (ALSF) in communication with the control station.

If the requested audio/video data is not stored at an available active line storage facility, the method retrieves the data from the mass storage facility (MSF). In this event, the method requires two additional steps to be performed. First, the audio/video data is transmitted from the mass storage facility to the active line storage facility. The audio/video data is then stored at the active line storage facility. Finally the method includes the step of transmitting the stored data from the active line facility unit to the remote viewing station.

The mass storage facility preferably includes at least two types of mass storage units. The first type of mass storage unit is a simple and economical long term memory unit for storing data which is unlikely to be updated or altered in the near future. The second type of mass storage unit is a more expensive short term memory unit for storing data which is temporary or likely to be updated, altered or replaced within a shorter time frame.

The active line storage facility of the invention preferably includes at least two types of Active line storage units ("ALSU"). The first type of ALSU is a simple and inexpensive storage unit which is capable and adept at randomly accessing requested data. The second type of ALSU is a linear storage unit which is particularly suited to sequential data access and delivery.

The system control unit is responsible for managing and coordinating the overall operation of the present invention. Preferably, the system control unit further manages the contents of the MSF and ALSF. The system control unit may track requests for programs and transfer the audio and video data between the MSF and the ALSF based on the number of tracked requests.

The system bus connects the MSF to the ALSF. The active line storage units of the ALSF are connected to the remote viewing stations via a network interface. In some embodiments, it will be preferable to have a system bus that is geographically distributed.

For efficiency and throughput, the system bus and the network interface need to be separate data transmission paths. For further efficiency, if an active line storage unit has a local bus, it should be independent of both the system bus and the network interface.

In embodiments in which the audio/video data is stored at the mass storage facility in a digital format, it is preferable to take advantage of digital data compression. Storing the digital audio/video data in a compressed format at the mass storage facility and the active line storage unit conserves storage resources, and transmitting the digital audio/video data in a compressed format maximizes data transmission rates.

One important feature of the preferred embodiment of the present invention is a pause function. This function permits a user at the remote viewing station to suspend transmission of the stored data from the active line storage unit to the remote viewing station.

To provide the pause function, the step of transmitting the stored data from the active line storage unit to the remote viewing station includes the step of receiving a signal from the remote viewing station indicating a request to pause transmission of stored data from the active line storage unit to the remote viewing station. Upon receiving the signal, the preferred method requires pausing the transmission of stored data from the active line storage unit to the remote viewing station.

The preferred method further includes the step of receiving a signal from the remote viewing station indicating a request to resume the step of transmitting. Finally, the preferred method includes the step of resuming the transmission of stored data from the active line storage unit to the remote viewing station at the standard playback speed.

Another feature provided by the preferred embodiment is a reverse-play function. This function permits a user at the remote viewing station to view images in a reverse order compared to the standard playback speed.

To provide the reverse-play function, the step of transmitting the stored data from the active line storage unit to the remote viewing station includes the step of receiving a signal from the remote viewing station indicating a request for reverse-play transmission of stored data from the active line storage unit to the remote viewing station. Upon receiving the signal, the preferred method requires transmitting the stored data from the active line storage unit to the remote viewing station in a reverse-play sequence.

The preferred method further includes the step of receiving a signal from the remote viewing station indicating a request to resume the step of transmitting. Finally, the preferred method includes the step of resuming the transmission of stored data from the active line storage unit to the remote viewing station at the standard playback speed.

Yet another feature provided by the preferred embodiment is a fast-forward function. This function permits a user at the remote viewing station to view images at a playback speed which is faster Then the standard playback speed.

To provide the fast-forward function, the step of transmitting the stored data from the active line storage unit to the remote viewing station includes the step of receiving a signal from the remote viewing station indicating a request for fast-forward transmission of stored data from the active line storage unit to the remote viewing station. Upon receiving the signal, the preferred method requires transmitting the stored data from the active line storage unit to the remote viewing station at a fast-forward playback speed.

The preferred method further includes the step of receiving a signal from the remote viewing station indicating a request to resume the step of transmitting. Finally, the preferred method includes the step of resuming the transmission of stored data from the active line storage unit to the remote viewing station at the standard playback speed.

Depending on the form of data compression used, it may be more expedient to implement fast-forward and fast-backward by not any transmitting data. Instead, the system would merely skip forward or backward a number of frames regulated by multiplying the desired skip time by a multiple of the standard frame delivery rate.

The approach taken by the present invention recognizes that the most effective solution to the problem is to use inexpensive, readily available hardware while improving the method and system of data transmission. In a video-on-demand system, data manipulation is rarely required. An effective solution to the problems of the prior art, therefore, should not focus on improved data processing, but should focus on streamlining data storage and transmission.

In carrying out the above objects and other objects of the present invention, a system is also provided for carrying out the steps of the above described method.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
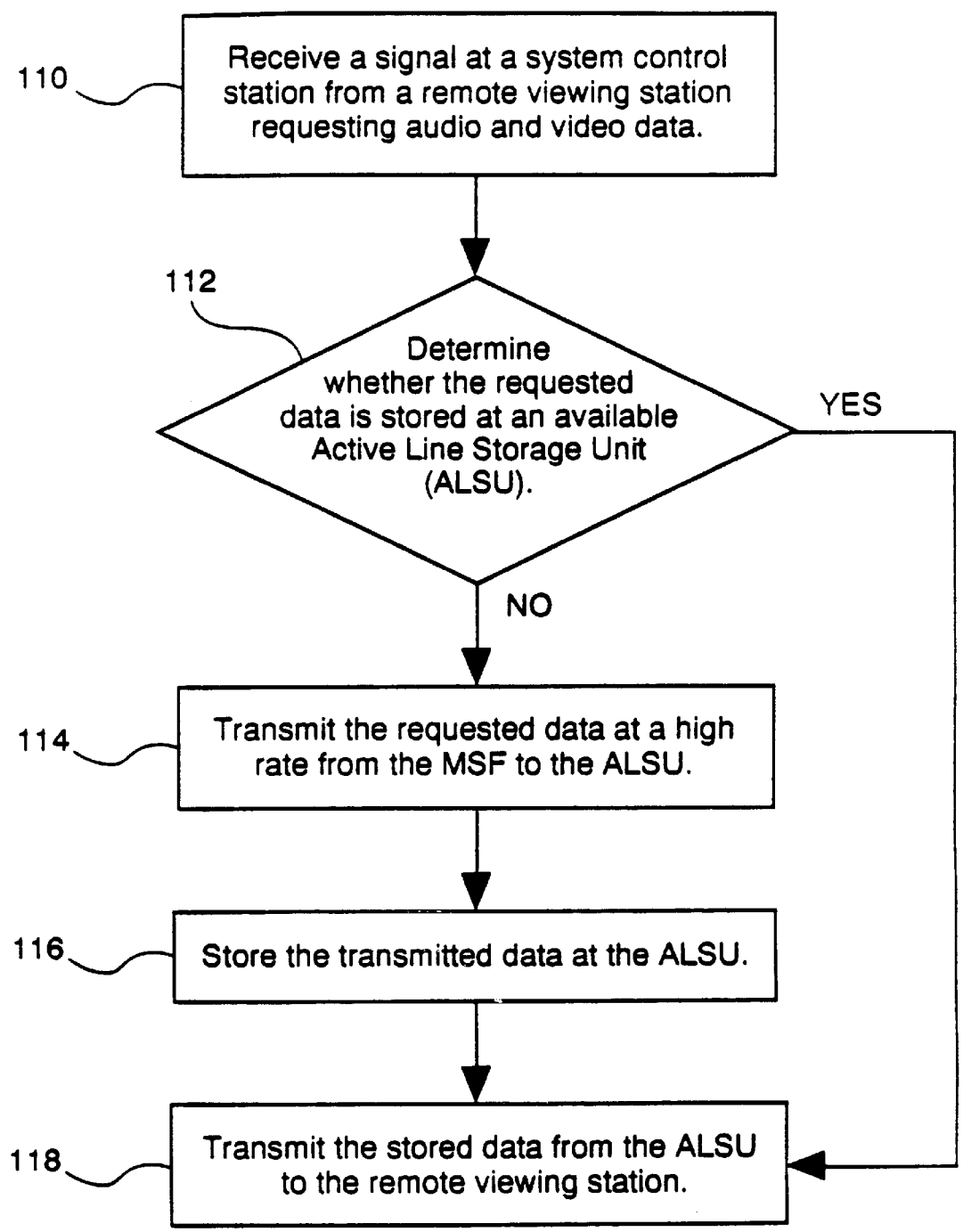
FIG. 1 is a flow chart illustrating the method for delivering audio/video data to a remote viewing station in a telecommunication system in accordance with the present invention.

The flow chart of FIG. 1 illustrates the method for delivering audio/video data to a remote viewing station in a telecommunication system in accordance with the present invention. As shown at block 110, the first step of the method is receiving a signal at a system control station from a remote viewing station. The signal represents a request to transmit audio/video data to the remote viewing station.

The next step of the method, shown at block 112, is determining whether the requested data is stored at a mass storage facility or at an active line storage unit. If the requested data is stored at the active line storage facility the method continues at block 118, otherwise the method proceeds with blocks 114 and 116.

Block 114 shows the step of transmitting the requested data at a high rate from the MSF to the ALSU. The audio/video data is digitally transferred over a system bus. The step of storing the transmitted data at the ALSU is described at Block 116.

The final step of the method, shown at Block 118, is transmitting the stored data from the ALSU to the remote viewing station. The audio/video data stored at the ALSU is digitally transferred using a network interface which directs the data to the correct remote viewing station.

In order to minimize the time interval between a user's request and transmission to the remote viewing station, it may be desirable to begin the final step of transmitting described at block 118 before completing the step of transmitting described at block 114. This can be accomplished through communication between the system control station and the ALSU.

System Architecture

Figure 2:
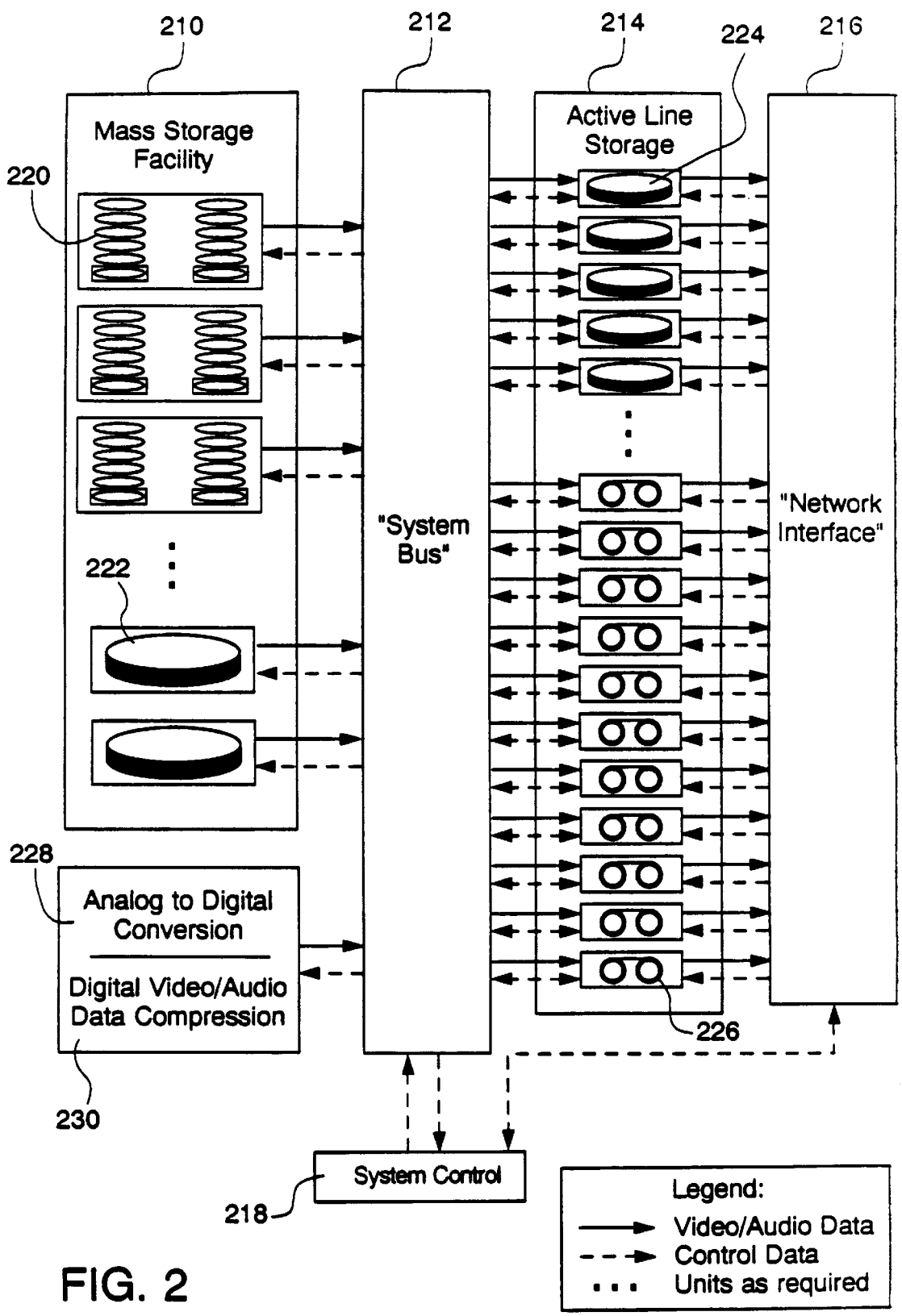
FIG. 2 is a block diagram illustrating the equipment used in the preferred embodiment of the present invention.

FIG. 2 illustrates the type of equipment used in the preferred embodiment as well as the system architecture of the present invention. The architecture provides two stages of information storage and transmission, the MSF 210 and the ALSU 214, interconnected by a high speed data transmission path, the system bus 212.

Block 210 shows the mass storage facility which provides economical storage of massive amounts of data. Block 214 shows the active line storage facility which includes many active line storage units 224 and 226. The system bus 212 connecting the MSF 210 and the ALSUs 224 and 226 provides the facility to transfer audio/video data from the MSF 210 to the ALSUs 224 and 226. This transfer rate should be from 10 to 100 times faster than the standard playback speed.

While the system bus 212 provides an efficient high-speed data transfer facility, transfer operations do not need to occur every time A/V data is requested. High demand A/V data such as previews and popular programs can be pre-stored at an ALSU and can be immediately accessed when requested. Such pre-storing of A/V data at the ALSU allows real-time high-speed data transfers to be restricted to requests for less popular A/V data, low demand A/V data and popular A/V data which has not been pre-stored due to ALSU storage constraints or greater than anticipated demand.

The network interface 216 transmits the A/V data from the ALSU to the remote viewing station (not shown). The network interface 216 must support a data transmission rate capable of providing a playback of the images and sounds represented by the audio/video data at a standard speed.

The system control unit 218 is responsible for coordinating the operation of the previously described system components. The functions performed by the system control unit 218 include receiving and processing viewing requests, assigning and activating ALSUs, and coordinating data downloads from the MSF to the ALSU.

Mass Storage Facility

The mass storage facility 210 includes a number of individual mass storage units. FIG. 2 illustrates two types of mass storage units: write-once-read-many ("WORM") juke-boxes 220 and conventional high-density magnetic disks 222. Although only two types of mass storage units are illustrated, other alternatives exist such as disk array technology.

Mass storage units 220 include optical, magneto optical or other WORM technology and are drawn to represent units often referred to as "juke-boxes". Juke-boxes include many storage media units served by only a few read heads. An example of this technology is the Kodak Optical Disk System 6800 Disk Library which provides for up to 100 14-inch optical disks served by two read units. Each disk provides up to 10 gigabytes of storage and can accommodate several compressed feature length movies. Future commercial releases of such products will provide 2 to 4 times the storage capacity.

The storage requirements of the mass storage units 220 and 222 can be determined using Motion Picture Experts Group (MPEG) standards. MPEG I provides for motion video and accompanying stereo audio to be digitally encoded to approximately 1.5 mega-bits per second (Mbps). At this rate, a 90 minute movie would require 1.0125 gigabytes (GB) of storage. Using the Kodak system as an example, each disk could hold almost 10 such movies.

Although MPEG I provides a baseline for the minimum storage requirements, a better standard might be the proposed MPEG II standard which addresses 2–8 Mbps encoding. MPEG II consequently provides increased consumer level quality. Applying this standard to the Kodak system, each disk could store from 2–9 90-minute movies requiring between 1.08 and 4.32 GB of storage each.

Mass storage units 222 are conventional high-density magnetic disk units. These units provide moderate cost storage and would be best suited for storing volatile or very recent temporary program material.

Providing two types of mass storage units at the mass storage facility allows the present invention significant advantages over the prior art. By using expensive short-term storage only when necessary allows the cost of the present invention to be contained. Furthermore, relying primarily on inexpensive, conventional technology for long-term storage at the MSF provides a reliable market for maintenance and replacement parts.

Active Line Storage Facility

The active line storage facility 214 includes a number of individual active line storage units. FIG. 2 illustrates two types of ALSUs: magnetic disk based units 224 and magnetic tape based units 226.

The magnetic disk based units 224 provide rapid random access for previews and program information. The magnetic tape based units 226 provide sequential access for cost-effective storage of feature length movies and other data for which random access is not crucial.

Each active line storage unit is associated with real-time delivery of audio/video data to a customer's remote viewing station. The units must be capable of delivering program data toward the remote viewing station at standard delivery speeds of 1.5 to 8 Mbps or greater. In addition the units must be capable of receiving data from the MSF 210 at a rate 10 to 100 times faster than the standard delivery speed.

Commercial equipment using current technology is available to perform the above described functions. For example, several inexpensive magnetic disk drives controlled by a small processor could provide the functionality required of an ALSU.

An attractive emerging technology is Electron Trap Optical Memory proposed by Optex. This technology promises 14 gigabytes of storage on a 5 ¼ inch disk and a transfer rate of up to 120 Mbps. Although only two types of mass storage units are illustrated, other alternatives exist such as disk array technology.

Providing two types of active line storage units at the active line storage facility allows the present invention significant advantages over the prior art. By using relatively expensive random access storage only when necessary allows the cost of the present invention to be contained. Furthermore, relying primarily on inexpensive, sequential access technology for the majority of the active line storage reduces the cost.

System Bus

The system bus 212 provides a data transmission path between the MSF 210 and the active line storage facility 214. The system bus needs to be capable of supporting several data streams at once. The number of concurrent data streams depends on the traffic for unanticipated customer requests.

It is anticipated that a system serving 1000 customers should have the facility to perform 4 simultaneous downloads at any time. Based on these figures, the system bus 212 would need to support data transfer rates of 600 to 2400 Mbps or 75 to 300 megabytes per second (MBps) to achieve transfer rates 100 times faster than standard playback speed.

Contemporary computer workstation buses in the medium price range can achieve the data transfer speeds needed. An example is the Sun Sparcstation "SBus" which can attain a peak transfer rate of 160–200 MBps.

In addition to data transfer rate requirements, the system bus 212 needs to connect arbitrary end points. This technology is currently available and is employed in many local-area-networks.

System Control Unit

The system control unit 218 is responsible for managing and coordinating the overall operation of the system. The system control unit is responsible for receiving and processing requests for programming, assigning and activating ALSUs, and coordinating downloads from the MSF 210 to the ALSUs 224 and 226.

The system control unit 218 should be able to recognize customers and maintain usage data for billing purposes as well as to maintain in-service and out-of-service information on system sub-units for maintenance. The system control unit 218 should also maintain a reasonable distribution of programs on the ALSUs.

All available programs (A/V data) are stored at the mass storage facility for long term storage. The system control unit should use the usage data to determine if a program stored at the mass storage facility has been frequently requested. In this event, the system control unit 218 should download the one or more copies of the program to one or more active line storage units for short-term storage. As a program becomes less frequently requested, the system control unit 218 can replace the program with another.

In addition, the system control unit 218 should provide support for VCR-like capabilities offered to customers through the network interface.

Network Interface

There are many possible embodiments of the network interface 216 of the present invention. One simple form of the network interface 216 is a distributor of DS-1 or higher rate channels to a switched DS-1 or higher rate network.

For the most efficient implementation, the network interface should be in direct communication with the active line storage units. Such an embodiment will improve the throughput of the interface and reduce data traffic.

Data/Signal Manipulation

The analog to digital conversion unit 228 and the digital audio/video data compression unit 230 simply provide for the digital encoding and compression of analog audio/video information for storage on the MSF 210. In general this should be an off-line, non-real time activity under the control of the system control unit 218.

What is claimed is:

1. A method for delivering audio and video data to a remote viewing station in a data transmission network, the remote viewing station having a display device for hearing sounds and viewing images displayed at a playback speed, the sounds and images represented by the audio and video data, the method comprising:

receiving a request for immediate transmission of the audio and video data from a viewer at the remote viewing station;

determining whether the requested data is stored at one of an active line storage facility that stores data temporarily and a mass storage facility that stores data permanently in order to select the manner in which the data is to be transmitted to the remote viewing station;

if the request data is stored at the mass storage facility, transmitting the requested data via a first system bus at a rate of 10 to 100 times faster than the playback speed directly from the mass storage facility to the active line storage facility; and transmitting the data via a network interface from said active line storage facility directly to the remote viewing station so as to deliver the requested data immediately following the viewer's request.

2. The method of claim 1 wherein the mass storage facility includes a long term mass storage unit and a short term mass storage unit and the step of transmitting the requested data includes the step of determining whether the requested data is stored at the long term mass storage unit or the short term mass storage unit.

3. The method of claim 1 wherein the active line storage facility includes at least two types of active line storage units.

4. The method of claim 3 wherein a first type of active line storage unit is a random access storage device and a second type of active line storage unit is a sequential access storage device.

5. The method of claim 4 wherein the step of transmitting the requested data includes the step of selecting between the first type of active line storage unit and the second type of active line storage unit based on the requested data.

6. The method of claim 1 wherein the requested data is stored at the mass storage facility in a compressed digital format.

7. The method of claim 1 wherein the step of transmitting the data from the active line storage facility to the remote viewing station further comprises:

receiving a signal from the remote viewing station indicating a request to pause transmission of data from the active line storage facility;

pausing the transmission of the data from the active line storage facility to the remote viewing station;

receiving a signal from the remote viewing station indicating a request to resume the step of transmitting; and resuming the transmission of the data from the active line storage facility to the remote viewing station.

8. The method of claim 1 wherein the step of transmitting the data from the active line storage facility to the remote viewing station further comprises:

receiving a reverse-play signal from the remote viewing station;

transmitting the data from the active line storage facility to the remote viewing station in a reverse-play sequence;

receiving a signal from the remote viewing station indicating a request to resume the step of transmitting; and resuming the transmission of the data from the active line storage facility to the remote viewing station at the standard playback speed.

9. The method of claim 1 wherein the step of transmitting the data from the active line storage facility to the remote viewing station further comprises:

receiving a reverse-play signal from the remote viewing station;

pausing the transmission of the data from the active line storage facility to the remote viewing station;

receiving a signal from the remote viewing station indicating a request to resume the step of transmitting at an earlier point in the data; and resuming the transmission of the data from the active line storage facility to the remote viewing station at the standard playback speed starting at the earlier point in the data.

10. The method of claim 1 wherein the step of transmitting the data from the active line storage facility to the remote viewing station further comprises:

receiving a fast-forward signal from the remote viewing station;

transmitting the data from the active line storage facility to the remote viewing station at a fast-forward playback speed;

receiving a signal from the remote viewing station indicating a request to resume the step of transmitting; and resuming the transmission of the data from the active line storage facility to the remote viewing station at the standard playback speed.

11. The method of claim 1 wherein the step of transmitting the data from the active line storage facility to the remote viewing station further comprises:

receiving a fast-forward signal from the remote viewing station;

pausing the transmission of the data from the active line storage facility to the remote viewing station;

receiving a signal from the remote viewing station indicating a request to resume the step of transmitting at a later point in the data; and resuming the transmission of stored data from the active line storage facility to the remote viewing station at the standard playback speed starting at the later point in the stored data.

12. A multi-stage storage delivery system for transmitting audio and video data to a remote viewing station, the remote viewing station having a display device for hearing sounds and viewing images displayed at a playback speed, the system comprising:

a mass storage facility for permanently storing the audio and video data;

transmission means connected to the mass storage facility for transmitting the audio and video data at a speed of 10 to 100 times faster than the playback speed between the mass storage facility and an active line storage facility;

an active line storage facility for temporarily storing audio and video data and being adapted to communicate with the transmission means for receiving the audio and video data;

interface means for connecting the active line storage facility to the remote viewing station; and a system control unit in communication with the interface means for receiving a request for audio and video data from a viewer at the remote viewing station, for selecting the manner in which the data is to be transmitted to the remote viewing station based on where the data is stored, for directing and monitoring data transmission between the mass storage facility and the active line storage facility if the requested data is not stored at the active line storage facility, and for directing data transmission from the active line storage facility to the remote viewing station in response to the viewer's request so as to deliver the requested data immediately following the request.

13. The system of claim 12 including a conversion means for converting analog signals into the audio and video data.

14. The system of claim 12 wherein the audio and video data is stored in a digital format at the mass storage facility, the system further comprising a compression means for compressing the audio and video data.

15. The system of claim 12 wherein the interface means includes a user control means permitting the user to control the transmission of the audio and video data between the active storage unit and the remote viewing station.

16. The system of claim 12 wherein the transmission means is geographically distributed.

17. The system of claim 16 wherein the mass storage units are geographically distributed.

18. The system of claim 12 wherein the mass storage units are geographically distributed.

19. The system of claim 12 wherein the interface means is a digital data network interface.

20. The method as recited in claim 1 wherein transmitting the data includes transmitting the data prior to completing transmitting the requested data from the mass storage facility to the active line storage facility.

21. The system as recited in claim 12 wherein the system control unit, in directing data transmission from the active line storage facility, is further operative to direct the active line storage facility prior to completion of data transmission between the mass storage facility and the active line storage facility.

* * * * *